United States Patent [19]

Brown et al.

[11] Patent Number: 5,669,696

[45] Date of Patent: *Sep. 23, 1997

[54] UNDERHOOD LAMP ASSEMBLY WITH GRAVITY-ACTUATED SWITCH

[75] Inventors: William M. Brown, Brighton; Kenneth A. Eklov, Farmington Hills, both of Mich.

[73] Assignee: Micro Craft, Inc., Novi, Mich.

[*] Notice: The term of this patent shall not extend beyond the expiration date of Pat. No. 5,477,428.

[21] Appl. No.: 639,559

[22] Filed: Apr. 29, 1996

Related U.S. Application Data

[62] Division of Ser. No. 396,965, Mar. 1, 1995, abandoned, which is a division of Ser. No. 262,963, Jun. 21, 1994, Pat. No. 5,477,428.

[51] Int. Cl.[6] .................. F21V 33/00; B60Q 3/06
[52] U.S. Cl. .................. 362/80; 362/276; 362/802; 200/61.52; 200/61.48
[58] Field of Search .................. 200/61.51, 61.48, 200/61.52, 61.58 R, 61.62; 362/61, 80, 276, 802, 154, 155

[56] References Cited

U.S. PATENT DOCUMENTS

| | | | |
|---|---|---|---|
| 1,055,153 | 3/1913 | Ferguson | 200/61.52 |
| 1,484,502 | 2/1924 | James | |
| 2,772,411 | 11/1956 | Cooper | 200/61.52 |
| 2,780,688 | 2/1957 | Stec | 200/61.52 |

(List continued on next page.)

OTHER PUBLICATIONS

Letter dated Nov. 21, 1991, from Thomas E. Maher to Chrysler Motors Corporation.
Letter dated Dec. 19, 1991, from Kenneth A. Eklov to Stergios Naoum of Chrysler Motors Coporation.
Interoffice Memorandum dated Feb. 11, 1992, from Tom Maher to Bill Brown.
Copy of Micro Craft Inc. Under-Hood Lamp Assembly drawing, Revision A, dated Mar. 11, 1992.

*Primary Examiner*—Thomas M. Sember
*Attorney, Agent, or Firm*—Marshall, O'Toole, Gerstein, Murray & Borun

[57] ABSTRACT

A gravity-actuated switch having a switch module with a switch housing and a lid. An electrically conductive pendulum is pivotally secured to the lid via a pivot pin so that the pendulum hangs within the housing and pivots with respect to the housing under the influence of gravity. A first electrical contact connectable to a power source abuts the pivot pin, which is electrically conductive. A second electrical contact is provided within the housing in a predetermined position such that the pendulum makes contact with it when the switch module is tilted by a predetermined amount. When the pendulum makes contact with the second electrical contact, a short circuit is provided across the pair of contacts, thus closing the switch. The switch is incorporated in a lamp assembly provided on the underside of the hood or trunk lid of an automobile to selectively provide power to a lamp so that the lamp is illuminated only when the hood or trunk lid is opened by at least a predetermined amount. A switch composed of a pivoting magnet and a magnetic switch can be used instead of the combination of the conductive pendulum and the curved electrical contact.

19 Claims, 6 Drawing Sheets

U.S. PATENT DOCUMENTS

| | | | |
|---|---|---|---|
| 2,891,235 | 6/1959 | Halpert | 362/80 |
| 3,109,597 | 11/1963 | Baldwin | 362/80 |
| 3,434,106 | 3/1969 | Lawless | 200/61.48 |
| 3,539,741 | 11/1970 | Voland | 200/61.62 |
| 3,548,400 | 12/1970 | Boyd et al. | 200/61.52 |
| 3,553,448 | 1/1971 | Davis | 240/7.1 |
| 3,564,171 | 2/1971 | Hammond | 200/61.52 |
| 3,576,409 | 4/1971 | Fiddler | 200/61.62 |
| 3,601,729 | 8/1971 | Hierta | |
| 3,692,992 | 9/1972 | Bain et al. | |
| 3,717,732 | 2/1973 | Porter | 200/61.45 |
| 3,748,415 | 7/1973 | Suzuki | 200/61.52 |
| 3,772,646 | 11/1973 | Keith et al. | 340/65 |
| 3,814,875 | 6/1974 | Takada | 200/61.48 |
| 3,898,400 | 8/1975 | Takada | 200/61.48 |
| 4,016,535 | 4/1977 | Dinlocker | 340/52 H |
| 4,103,842 | 8/1978 | Martin | 200/61.52 |
| 4,316,239 | 2/1982 | Cass et al. | 362/155 |
| 4,320,384 | 3/1982 | Carlson | 200/61.45 M |
| 4,820,888 | 4/1989 | Shields | 200/61.45 M |
| 4,884,179 | 11/1989 | Moore | 362/295 |
| 4,910,634 | 3/1990 | Pipkorn | 361/147 |
| 5,256,839 | 10/1993 | Gallagher | 200/61.52 |
| 5,477,428 | 12/1995 | Brown et al. | 362/80 |

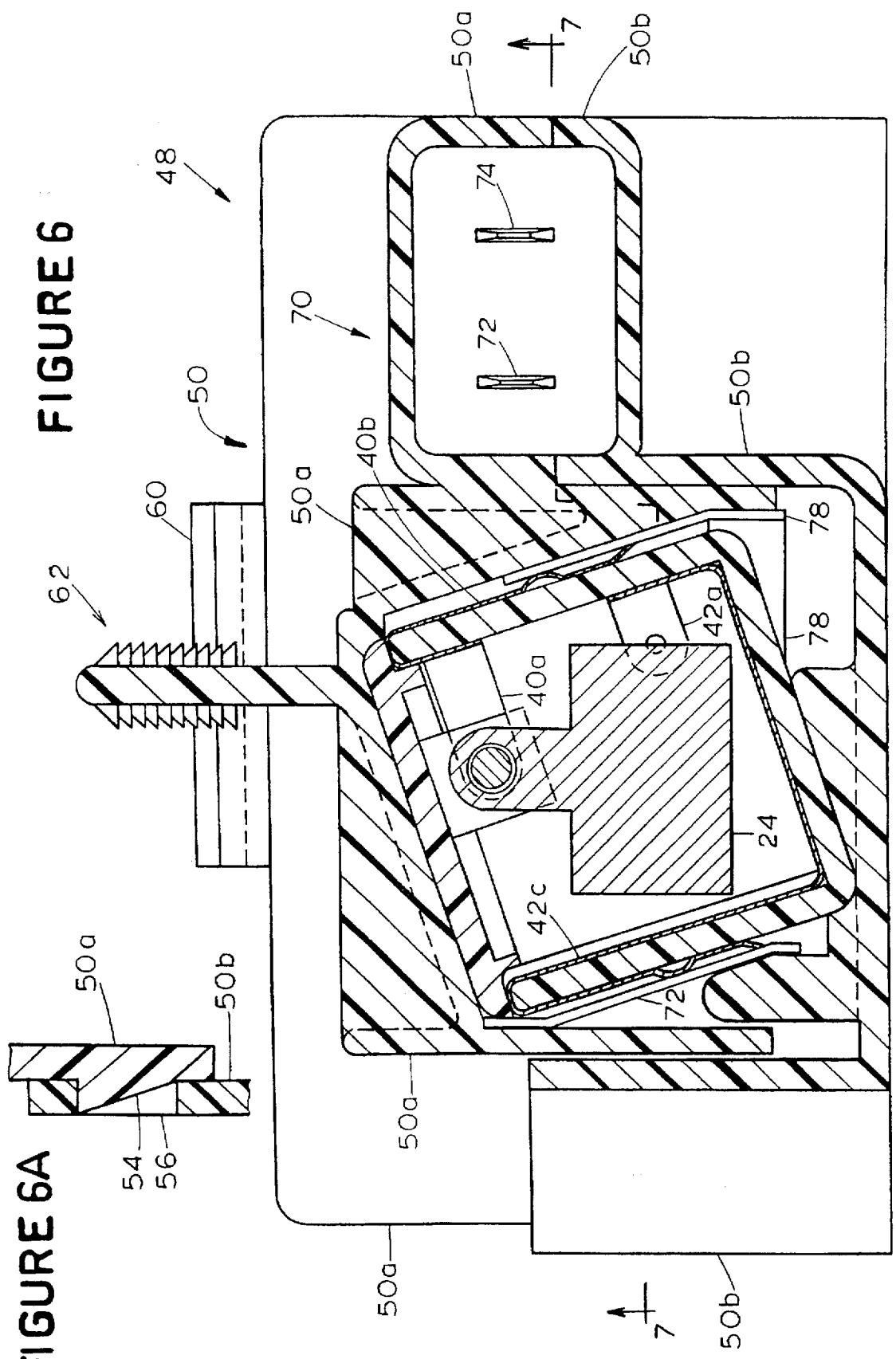

UNDERHOOD LAMP ASSEMBLY WITH GRAVITY-ACTUATED SWITCH

This application is a divisional of U.S. Ser. No. 08/396,965 filed Mar. 1, 1995 now abandoned, which is a divisional of U.S. Ser. No. 08/262,963 filed Jun. 21, 1994, now U.S. Pat. No. 5,477,428.

BACKGROUND OF THE INVENTION

The present invention is directed to an underhood lamp assembly having a gravity-actuated switch for selectively supplying power to an underhood lamp.

Gravity-actuated switches have been used in the past to supply power to a lamp provided beneath the hood of an automobile to illuminate the engine when the hood is raised. When the hood is lowered, the gravity-actuated switch disconnects the lamp from the power source. Such switches have also been used on the trunk lid of an automobile.

Various types of gravity-actuated switches have been previously devised. For example, one conventional type of gravity-actuated switch, known as a mercury switch, contains elemental mercury which in its natural liquid state flows under the influence of gravity to selectively interconnect a pair of electrical contacts. Although their operation is generally satisfactory, mercury switches have the disadvantage that they contain mercury, which may cause harm when exposed to the environment.

Another disadvantage of gravity-actuated switches is that the load current which is used to supply electrical power to activate a power-consuming device is typically passed through the switch itself. As a result, electrical contact arcing may occur across the contacts of the switch, thus shortening the operating life of the switch and generating undesirable electromagnetic interference.

SUMMARY OF THE INVENTION

The present invention is directed to an underhood lamp assembly having a gravity-actuated switch with a relatively simple and reliable design and which presents no environmental problems.

The switch is provided in a switch module having a switch housing and a lid. An electrically conductive pendulum is pivotally secured to the lid via a pivot pin so that the pendulum hangs within the housing and pivots with respect to the housing under the influence of gravity. A first electrical contact connectable to a power source abuts the pivot pin, which is electrically conductive. A second electrical contact is provided within the housing in a predetermined position such that the pendulum makes contact with it when the switch module is tilted by a predetermined amount. When the pendulum makes contact with the second electrical contact, a short circuit is provided across the pair of contacts, thus closing the switch.

The switch module may be incorporated in a lamp assembly provided on the underside of the hood or trunk lid of an automobile to selectively provide power to a lamp such that the lamp is illuminated only when the hood is opened by at least a predetermined amount. The lamp assembly may also include a connector for connecting the lamp assembly to a source of power for illuminating the lamp. Because the switch is modular, it can be incorporated in various types of lamp assemblies.

In another embodiment of the invention, the switch is provided in the form of a pivoting magnet disposed for pivotal movement adjacent a magnetic switch having a pair of switch contacts. When the hood or trunk lid is raised causing the pivoting magnet to move towards the magnetic switch, the contacts of the magnetic switch close, thus causing a short circuit to be provided across the contacts, closing the switch, and causing the lamp to be illuminated.

An electrical circuit is provided to cause a load current to be supplied to the lamp from a source of electrical power, but not through the switch itself. Because the load current does not pass through the switch, electrical contact arcing across the switch contacts is prevented and electromagnetic interference is reduced. The electrical circuit may include a control or biasing circuit electrically connected to the switch and an electrical switch, such as a transistor, electrically connected between the lamp and a source of power, to selectively generate the load current to turn the lamp on and off.

The features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 6 is a cross-sectional view of the lamp assembly of FIG. 5;

FIG. 6A is a cross-sectional view of a lamp assembly housing connector;

DETAILED DESCRIPTION OF THE PREFERRED EMBODIMENTS

Figure 1:
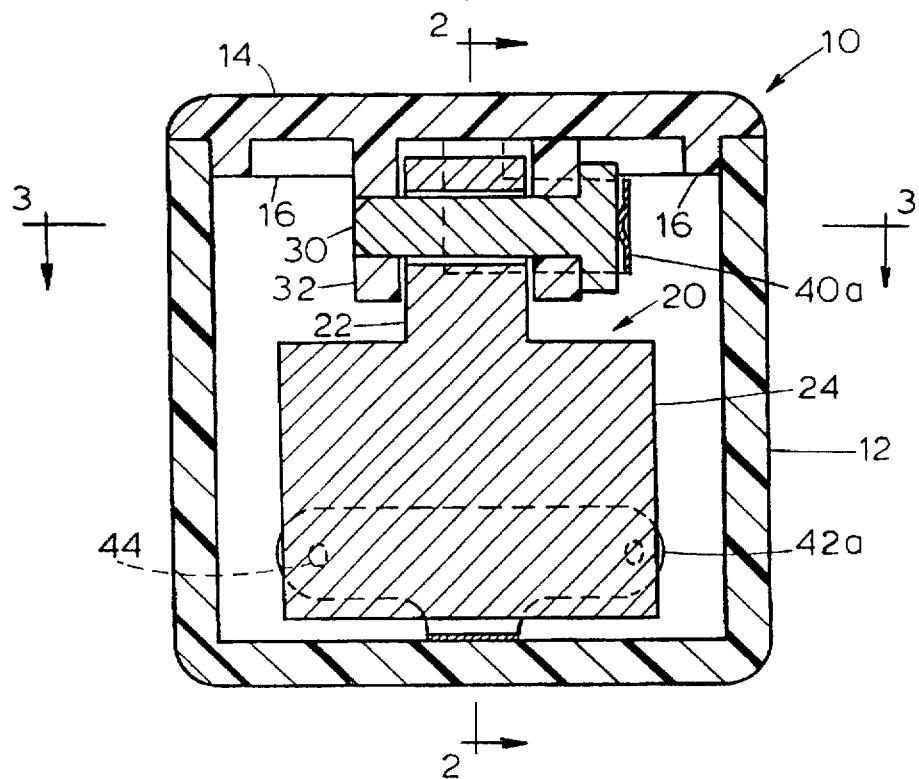
FIG. 1 is a cross-sectional front view of a first embodiment of a switch module in accordance with the invention, with some lines not shown for clarity.
Figure 2:
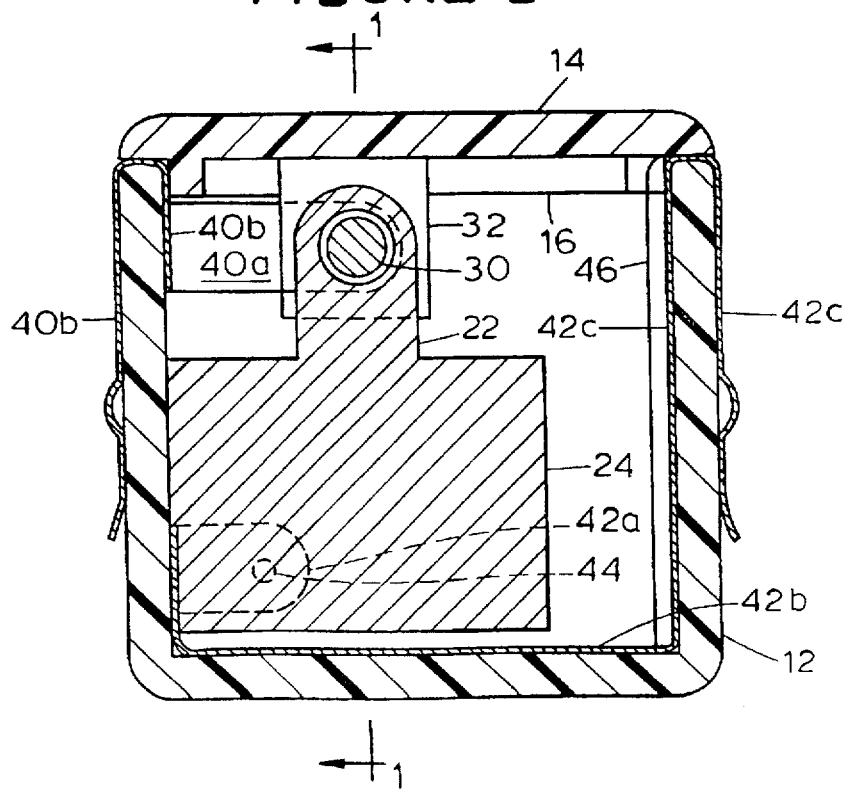
FIG. 2 is a cross-sectional side view of the switch module taken along the lines 2—2 of FIG. 1, with some lines not shown for clarity.
Figure 3:
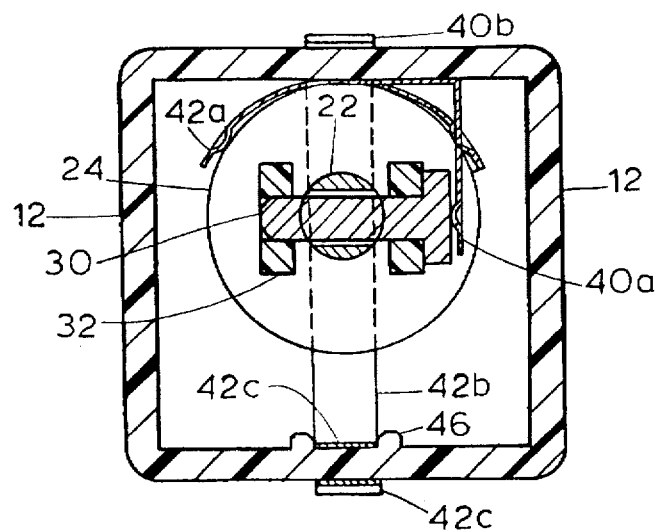
FIG. 3 is a cross-sectional top view of the switch module taken along the lines 3—3 of FIG. 1.

A first embodiment of a gravity-actuated switch module 10 is shown in FIGS. 1–3. Referring to FIG. 1, the switch module 10 includes a switch casing having a lower, generally cube-shaped housing 12 and a removable lid 14 having a downwardly extending flange 16 provided adjacent the interior of housing 12. Housing 12 may be plastic, such as nylon. Switch lid 14 may be sonically welded to the switch housing 12 to prevent corrosive substances from entering the interior of the housing 12, resulting in the switch module 10 being environmentally resistant.

An electrically conductive pendulum 20 is provided within the switch housing 12. The pendulum 20 has a cylindrical upper arm portion 22 of a relatively small diameter and a cylindrical lower bob portion 24 of a relatively large diameter. The pendulum 20 is pivotally attached to the switch lid 14 via an electrically conductive pivot pin 30 which passes through a bore in the arm portion 22 of the pendulum 20. The pivot pin 30 is mounted within a pin support member 32 extending downwardly from the lid 14. The pivot pin 30 may be threaded into the support member 32, or the pin 30 may have a smooth exterior. Although a small space is shown between the pivot pin 30 and the interior surface of the bore in arm 22 of the pendulum in the drawings, it should be understood that pivot pin 30 and arm 22 are always in contact with each other at the bore in arm 22, and thus there is always a short circuit between them. The pendulum 20 and the pivot pin 30 may be composed of any conductive material, e.g. machinable brass.

The switch module 10 includes a first electrical contact 40 provided in contact with the pivot pin 30 and a second electrical contact 42 provided to selectively make or break contact with the bob portion 24 of the pendulum 20, depending on the orientation of the switch module 10, as described in more detail below.

The electrical contact 40 has a first portion 40a which abuts the head of the pivot pin 30 and a second portion 40b, integrally formed with the first portion 40a, which engages one of the walls of the housing 12. The electrical contact 42 has a first portion 42a of an arcuate shape (see FIG. 3) having a pair of dimples 44 formed therein. The arcuate portion 42a is integrally connected with an intermediate portion 42b which runs along the bottom of switch housing 12 and is integral with a third portion 42c which engages one of the walls of the switch housing 12. The electrical contacts 40, 42 may be made of copper or copper alloy, such as beryllium-copper alloy.

Referring to FIG. 3, the electrical contact portion 42c is anchored in place within a pair of guide rails 46 formed integrally with an interior wall of the housing 12. The electrical contact portion 40 may also be anchored in place via a guide channel (not shown) similar to the guide rails 46 or other guide means. Due to its abutment against the head of the pivot pin 30, the electrical contact 40a may act to prevent substantial movement of the pivot pin 30 in an axial direction relative to the pin support member 32 so that the pin 30 is retained in the member 32.

When the bob portion 24 of the pendulum 20 is out of contact with the arcuately shaped electrical contact 42a, the center of curvature of the contact 42a is the same as that of the bob portion 24. The electrical contact 42a is preferably made of resiliently yielding conductive material which occupies a first, unyielded position when the bob portion 24 is not in contact with it, and a second, yielded position when the bob portion 24 engages the contact 42a. In the latter case, contact between the two components 42a, 24 is made at three circumferentially spaced points, including at the dimples 44 and a central point between the dimples 44 (shown at the top portion of FIG. 3).

Referring to FIG. 6, the switch module 10 of FIGS. 1–3 is shown provided within a lamp assembly 48 having a two-piece housing 50 with an upper portion 50a and a lower portion 50b. The two housing portions 50a, 50b are removably interconnected via a plurality of snap connectors as shown in FIG. 6A. Each snap connector comprises an angled ridge 54 formed on the exterior of the upper housing portion 50a and an aperture 56 formed in the lower housing portion 50b. When the housing portions 50a, 50b are snapped together, the upper flat edge of the angled ridge 54 retains the housing portion 50b in place. The housing portion 50b can be removed by forcing the two housing portions 50a, 50b laterally apart and lowering the housing portion 50b. The lamp assembly housing 50 may be any high-heat resistant plastic, e.g. G.E. Valox 420 or 430 nylon.

The housing 50 is shown anchored to a pivotally movable cover portion 60, which may be a portion of the underside of a hood or trunk lid of an automobile, via a connector 62 formed integrally with the upper housing portion 50a. The interior surfaces of the housing 50 are angled so as to tilt the switch module 10 at a predetermined angle with respect to the horizontal.

Figure 4:
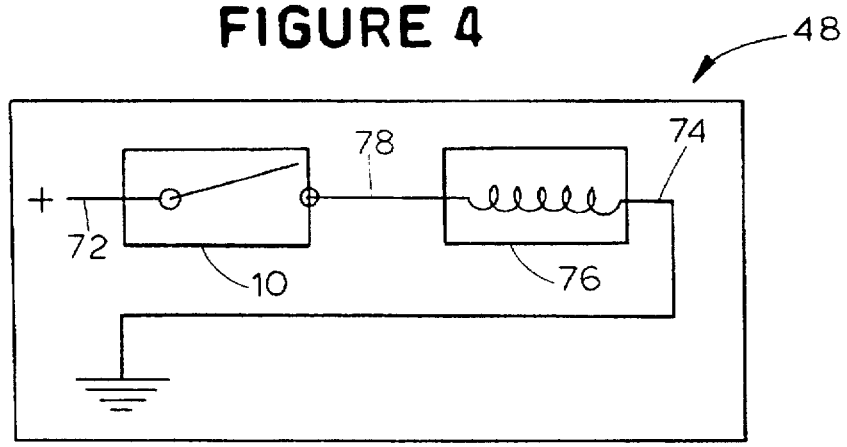
FIG. 4 is a schematic circuit diagram of the first embodiment of the lamp assembly.
Figure 7:
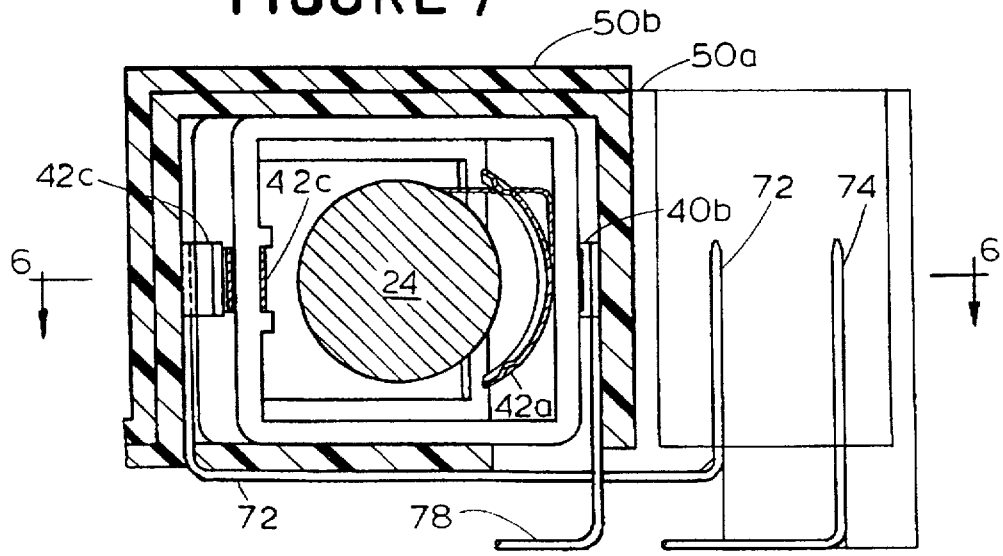
FIG. 7 is a partial cross-sectional top view of the lamp assembly taken along lines 7—7 of FIG. 6.

An electrical connector 70 having a first conductor 72 and a second conductor 74 is provided in the housing 50. The electrical connector 70 is used to connect the lamp assembly 48 to a source of power, such as a car battery. As shown in FIGS. 6 and 7, the conductor 72 extends from the connector 70 to make contact with the electrical contact 42c of the switch module 10. The second conductor 74 is electrically connected to a first terminal of a lamp provided within the housing 50. The lamp is shown schematically at 76 in FIG. 4. The lower housing portion 50b adjacent the lamp 76 is preferably a clear material to facilitate the passage of light therethrough. A third conductor 78 interconnects the second terminal of the lamp 76 with the electrical contact 40c, as shown in FIGS. 6 and 7. The conductors 70, 72, 78 may be any conductive material, e.g. brass. An electrical circuit diagram of the lamp assembly 48 is shown in FIG. 4.

Figure 5:
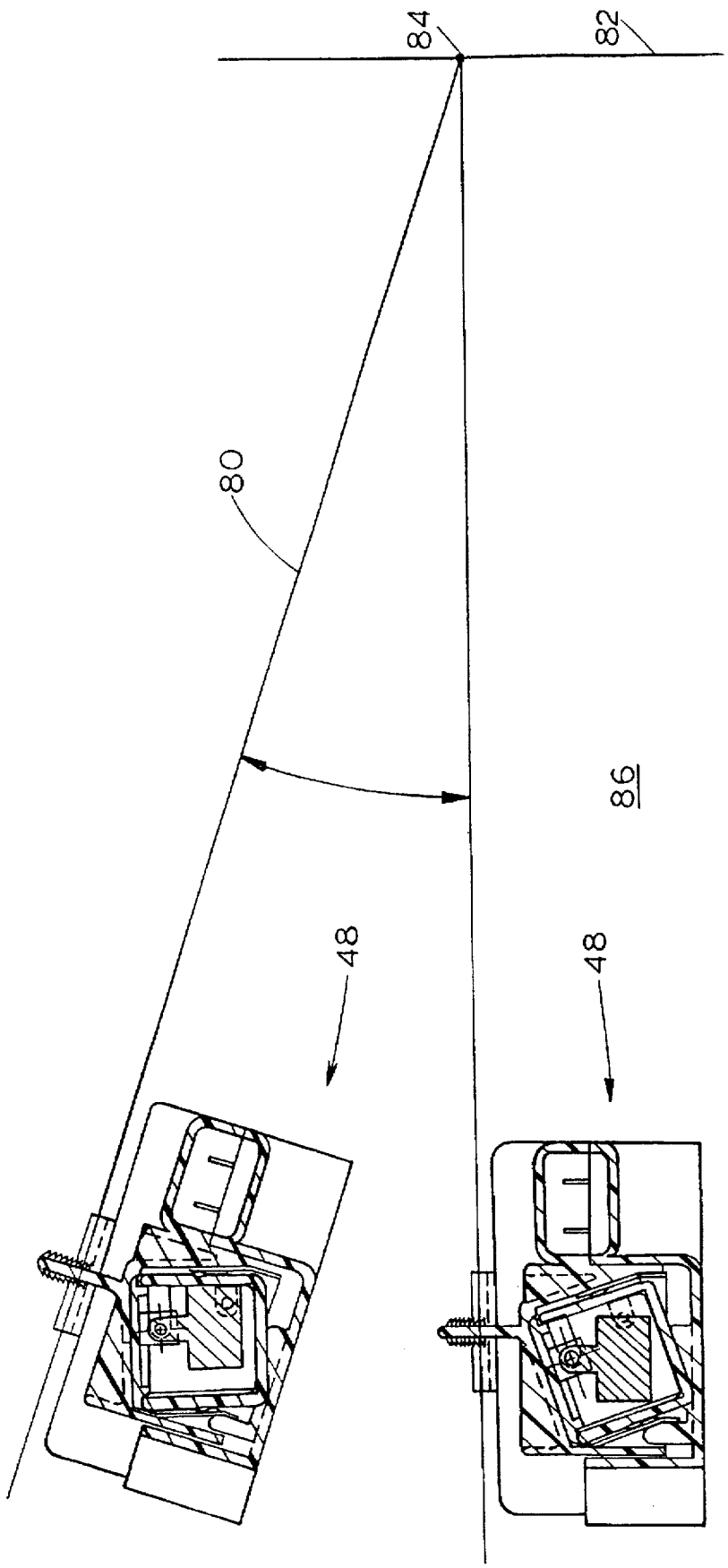
FIG. 5 is a cross-sectional side view of the first embodiment of an underhood lamp assembly in two different positions.

The operation of the lamp assembly 48 is illustrated in FIG. 5. Referring to FIG. 5, the lamp assembly 48 is shown mounted to a schematically illustrated cover 80, such as the hood or trunk lid of a car. The cover 80 is pivotally joined to a schematically shown mounting surface 82, such as the firewall of a car, at a pivot point 84. The cover 80 and mounting surface 82, along with other surfaces (not shown) define an enclosure designated 86 in FIG. 5.

When the cover 80 occupies a horizontal or closed position, the pendulum 24 occupies a first position in the interior of the switch module 10 and in which the pendulum 24 does not make contact with the arcuate electrical contact 42a (FIG. 7). As a result, the lamp 76 is not connected to the power source and is not illuminated. When the cover 80 is pivoted to an inclined or open position, the pendulum 24 pivots under the influence of gravity to a second position at which it makes contact with the electrical contact 42c (FIG. 2), thus connecting power source to the lamp 76 and illuminating the enclosure 86.

The weight of the pendulum 20 and the angle at which the switch module 10 is provided within the lamp assembly housing 50 may be selected so as to minimize or eliminate any inadvertent contact between the pendulum bob 24 and the electrical contact 42c due to acceleration or deceleration of the car when the cover 80 is closed.

Figure 8:
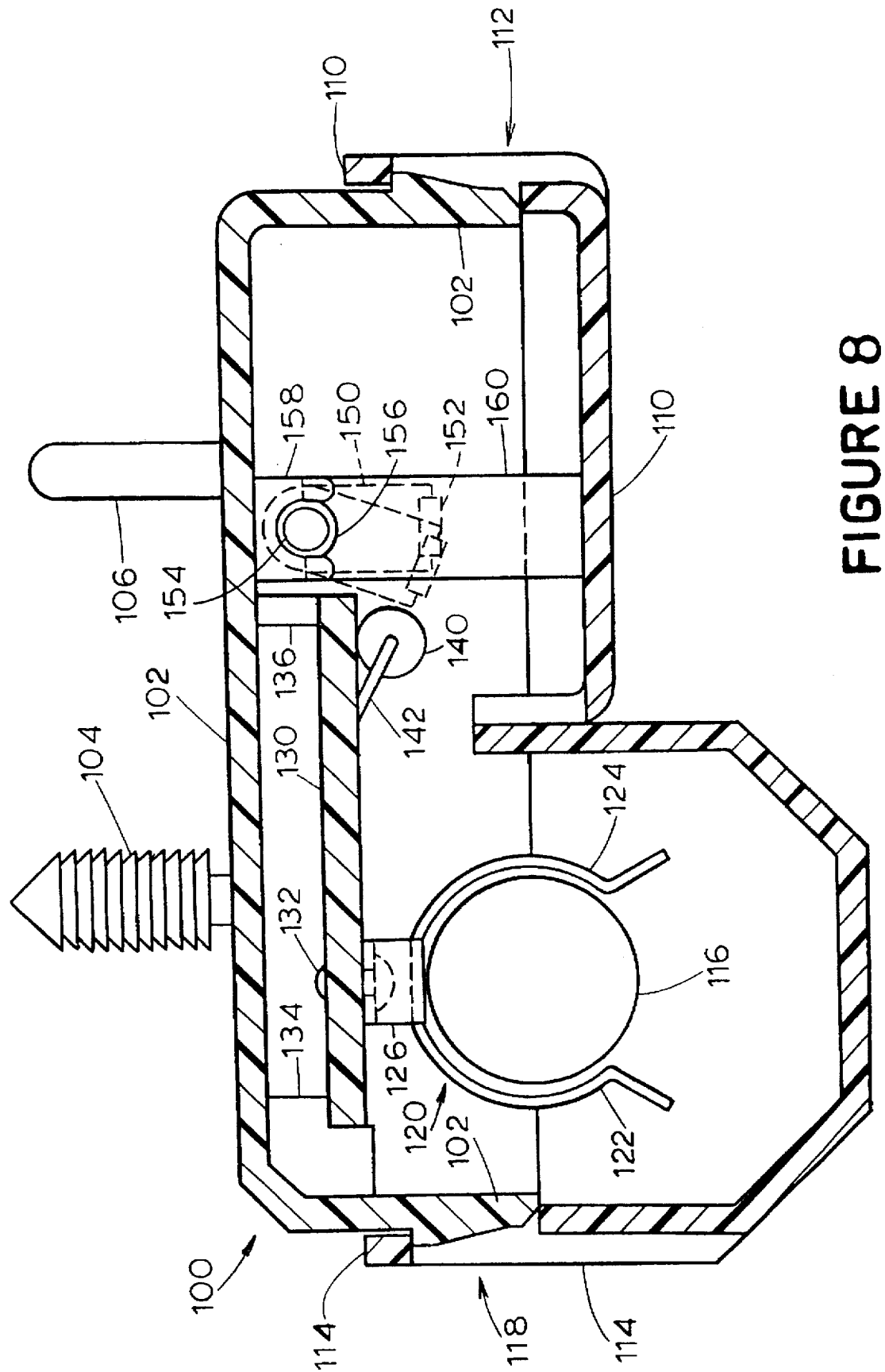
FIG. 8 is a partial cross-sectional view of a second embodiment of a lamp assembly in accordance with the invention with some lines not shown for clarity.
Figure 9:
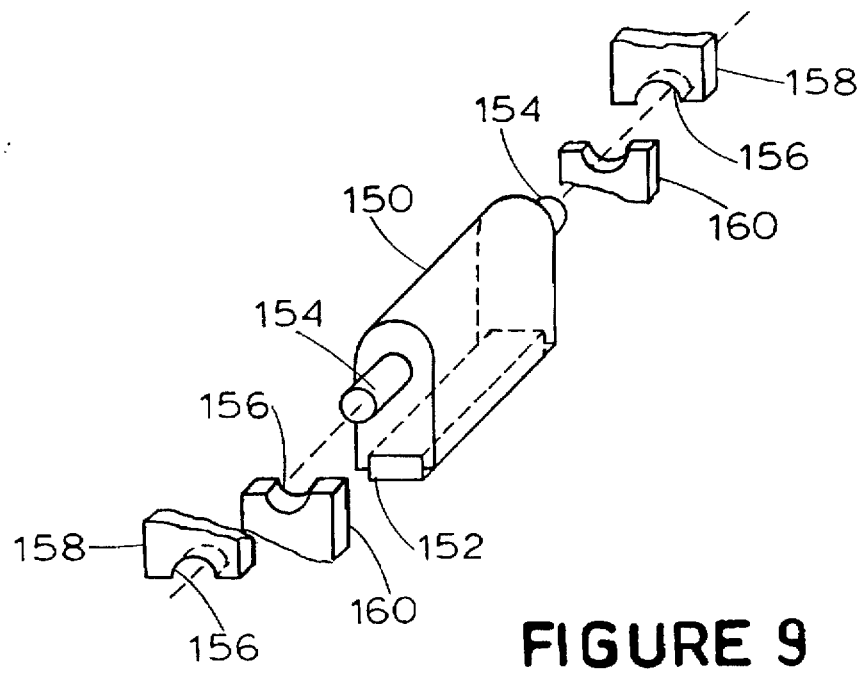
FIG. 9 is an exploded perspective view of a portion of the lamp assembly of FIG. 8.
Figure 10:
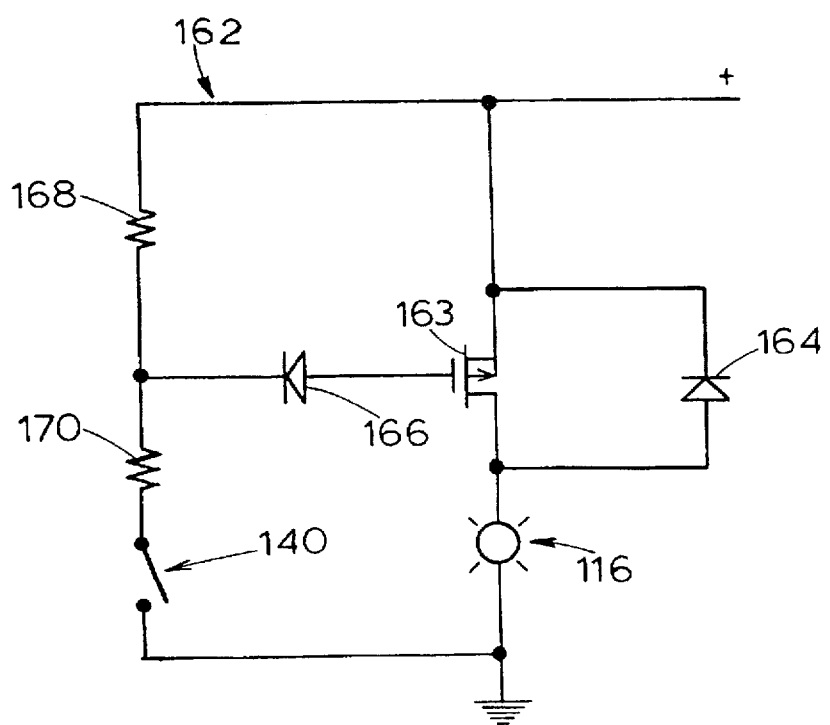
FIG. 10 is a circuit diagram of the second embodiment of the lamp assembly.

A second embodiment of a lamp assembly 100 in accordance with the invention is illustrated in FIGS. 8–10. Referring to FIG. 8, the lamp assembly 100 has an upper housing portion 102 which is connectable to the underside of a hood or trunk lid of a vehicle via a connector 104 fixed to the upper housing portion 102. An upwardly extending locating pin 106 is connected to the upper housing portion 102 for the purpose of preventing rotation of the lamp assembly 100 after it is installed on the underside of the hood or trunk lid.

A first lower housing portion 110 is connected to the upper housing portion 102 via a plurality of snap connectors, one of which is shown at 112. A second lower housing portion 114, which encloses a cylindrical lamp bulb 116 and is preferably composed of a clear plastic material, is connected to the upper housing portion 102 via a plurality of snap connectors, one of which is shown at 118.

The lamp 116 is supported by two mounting brackets 120, one of which is provided at each of the two ends of the cylindrical lamp bulb 116. Each mounting bracket, which may be composed of metal, has a pair of arms 122, 124 which are curved to generally conform to the outer diameter of the lamp 116 and a mounting plate 126 integrally formed with the curved arms 122, 124. Each mounting plate 126 is fixed to a support plate 130, which may be a printed circuit board for example, via a connecting means such as a rivet 132. The support plate 130 is connected to a pair of support members 134, 136 integrally formed with the upper housing portion 102.

A generally cylindrical magnetic switch 140, such as a reed switch, is fixed to the support plate 130 via two electrically conductive support arms 142, one of which is connected to each of the two ends of the cylindrical switch 140. A pendulum 150 is disposed for pivotal movement, under the influence of gravity, at an elevation generally the same as the magnetic switch 140.

Referring also to FIG. 9, which is an exploded perspective view of the pendulum 150 and related components, a bar magnet 152, which has a length approximately equal to the length of the magnetic switch 140, is connected to the underside of the pendulum 150. The pendulum 150 is pivotally supported by a pair of cylindrical arms 154 connected to the ends of the pendulum 150. Each of the cylindrical arms 154 is rotatably journalled within a respective generally U-shaped aperture 156 formed in each of a pair of support members 158 which extend downwardly from the upper housing portion 102 and formed in each of a pair of support members 160 which extend upwardly from the lower housing portion 110.

FIG. 10 illustrates an electrical circuit 162 which controls the illumination of the lamp 116. The electrical circuit 162, which may be formed on or attached to the support plate 130, includes a field-effect transistor ("FET") 163 connected between a voltage source schematically designated as "+" and the lamp 116. A diode 164 is connected in parallel with the source and drain terminals of the FET 163. The gate terminal of the FET 163 is connected to a diode 166, which is in turn connected to the junction of a pair of resistors 168, 170.

The operation of the lamp assembly 100 is described below in connection with FIGS. 8 and 10. Referring to FIG. 8, when the lamp assembly 100 is connected to the underside of a hood or trunk lid of a vehicle, the pendulum 150 may pivot, under the influence of gravity, between a first, vertical position (when the hood or trunk lid is closed) in which the pendulum 150 is spaced from the magnetic switch 140 by a relatively large distance and a second, nonvertical position (when the hood or trunk lid is opened by a predetermined amount) in which the pendulum 150 is spaced from the magnetic switch 140 by a relatively small distance. When the pendulum 150 pivots to the second position, the close proximity of the magnet 152 to the magnetic switch 140 causes a pair of electrical contacts (not shown) within the switch 140 to close.

Referring to FIG. 10, the values of the resistors 168, 170 are selected so that when the switch 140 is closed, the voltage at the gate of the FET 163 causes a relatively large load current to pass from the voltage source through the source and drain terminals of the FET 163 and through the lamp 116 to illuminate the lamp 116. The resistors 168, 170 are used only for biasing the FET 163, and any current that passes through them and the switch 140 when it is closed is relatively small. As a result, electrical arcing across the contacts of the switch 140 along with the associated electromagnetic interference is prevented or minimized.

When the pendulum 150 occupies its first vertical position in which it is spaced relatively far from the magnetic switch 140, the switch 140 opens, which changes the voltage at the gate of the FET 163, causing the FET 163 to become nonconductive and preventing any load current from passing through the lamp 116, thus turning the lamp 116 off.

The magnet 152 is preferably selected to be strong enough to generate a magnetic field of sufficient intensity so that slight vibrations or movements in the vehicle hood or trunk lid, when in its raised position, do not cause the lamp 116 to turn on and off, or flicker.

Modifications of the embodiments described above could be made without departing from the scope of the invention. For example, the circuit diagram 162 of FIG. 10 could be incorporated in the lamp assembly 10 illustrated in FIGS. 1–3 and 7.

Additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A lamp assembly adapted to be mounted to the underside of a hinged cover member of a vehicle to illuminate a compartment of the vehicle when the hinged member is opened to a predetermined extent, said lamp assembly comprising:

a housing member capable of being moved between a pair of predetermined positions each angularly displaced from the other;

means for connecting said housing member to said cover member;

a pendulum;

means mounting said pendulum on said housing member for pivotal movement of said pendulum, relative to said housing member, between a first pendulum position and a second pendulum position angularly displaced from said first pendulum position;

said pendulum and said mounting means for the pendulum comprising means cooperating (a) to maintain said pendulum in its first position when said housing member is in one of said pair of predetermined positions and (b) to allow the pendulum to move, under an urging of gravity, from the pendulum's first position to its second position in response to movement of said housing member from its one predetermined position to another of said pair of predetermined positions for the housing member, angularly displaced from said one position of the housing member;

a first electrical contact; and a second electrical contact comprising means for engaging said pendulum when the pendulum is in its second position;

said second electrical contact being spaced from and disengaged from said pendulum when the pendulum is in its first position;

a lamp electrically connected to one of said electrical contacts; and the other one of said electrical contacts comprising means electrically connectable to a source of electrical energy for said lamp, to illuminate said lamp when said pendulum is in said second position.

2. A lamp assembly as recited in claim 1 wherein said pendulum comprises:

means responsive to the movement of said pendulum from its first to its second position for bringing said first and second electrical contacts into electrical connection with each other.

3. A lamp assembly as recited in claim 1 wherein said mounting means for the pendulum comprises:

a pivot pin defining the pivotal axis for said pendulum;

means mounting said pendulum on said pivot pin; and means mounting said pivot pin on said member.

4. A lamp assembly as recited in claim 3 wherein:

said pendulum is composed of electrically conductive material;

said pivot pin is composed of electrically conductive material and is in electrical engagement with the pendulum when the pendulum is in its first and second positions; and said first electrical contact is in electrical engagement with said pivot pin when the pendulum is in its first and second positions.

5. A lamp assembly as recited in claim 4 wherein:

said pivot pin comprises a pair of opposite axial ends;

and said first electrical contact comprises means for engaging said pivot pin at one axial end thereof and for preventing substantial movement of said pivot pin in an axial direction relative to said mounting means for the pivot pin.

6. A lamp assembly as recited in claim 4 wherein:

said first electrical contact comprises means for retaining said pivot pin in its mounting means.

7. A lamp assembly as recited in claim 1 wherein:

said pendulum comprises an arm portion and a bob portion;

said bob portion having a circular cross section in a plane (a) which is parallel to the pivotal axis of said pendulum and (b) extends transversely to said arm portion of the pendulum.

8. A lamp assembly as recited in claim 7 wherein:

said second electrical contact has an arcuately shaped part for embracingly engaging said cylindrically shaped bob portion of the pendulum when the pendulum is in its second position.

9. A lamp assembly as recited in claim 8 wherein:

said arcuately shaped part has a pair of opposite ends and a dimple, adjacent each of said ends, for engaging said cylindrically shaped bob portion of the pendulum.

10. A lamp assembly as recited in claim 9 wherein:

said arcuately shaped part comprises means, including said dimples, for engaging said cylindrically shaped bob portion at three circumferentially spaced locations thereon.

11. A lamp assembly as recited in claim 8 wherein:

said arcuately shaped part has the same center of curvature as said cylindrically shaped bob portion of the pendulum, when the pendulum is in its second position.

12. A lamp assembly as recited in claim 8 wherein:

said arcuately shaped part is composed of yieldable resilient material;

said arcuately shaped part (a) is normally in an unyielded condition when said bob portion is in its first position and (b) comprises means for resiliently yielding in response to engagement by said bob portion when the bob portion moves from its first to its second position.

13. A lamp assembly adapted to be mounted to the underside of a hinged cover member of a vehicle to illuminate a compartment of the vehicle when the hinged member is opened to a predetermined extent, said lamp assembly comprising:

a housing member capable of being moved between a pair of predetermined positions each angularly displaced from the other;

means for attaching said housing member to the hinged cover member;

a pendulum;

means mounting said pendulum on said housing member for pivotal movement of said pendulum, relative to said housing member between a first pendulum position and a second pendulum position angularly displaced from said first pendulum position;

said pendulum and said mounting means for the pendulum comprising means cooperating (a) to maintain said pendulum in its first position when said housing member is in one of said pair of predetermined positions and (b) to allow the pendulum to move, under an urging of gravity, from the pendulum's first position to its second position in response to movement of said housing member from its one predetermined position to another of said pair of predetermined positions for the housing member, angularly displaced from said one position of the housing member;

a first electrical conductor comprising means electrically connectable to a source of electrical energy for said lamp assembly;

a second electrical conductor comprising means for engaging said pendulum when the pendulum is in its second position, said second electrical conductor being spaced from and disengaged from said pendulum when the pendulum is in its first position;

a third electrical conductor comprising means electrically connectable to a source of electrical energy for said lamp assembly; and a lamp electrically connected to said second and third electrical conductors, said first and second electrical conductors being electrically connected, causing said lamp to be illuminated, when said pendulum is in said second pendulum position, and said first and second electrical conductors being electrically disconnected, causing said lamp to be extinguished, when said pendulum is in said first pendulum position.

14. A lamp assembly, comprising:

a housing member capable of being moved between a pair of predetermined positions each angularly displaced from the other;

a pendulum;

means mounting said pendulum on said housing member for pivotal movement of said pendulum, relative to said housing member, between a first pendulum position and a second pendulum position angularly displaced from said first pendulum position;

said pendulum and said mounting means for the pendulum comprising means cooperating (a) to maintain said pendulum in its first position when said housing member is in one of said pair of predetermined positions and (b) to allow the pendulum to move, under an urging of gravity, from the pendulum's first position to its second position in response to movement of said housing member from its one predetermined position to another of said pair of predetermined positions for the housing member, angularly displaced from said one position of the housing member;

a first electrical conductor comprising means electrically connectable to a source of electrical energy for said lamp assembly;

a second electrical conductor comprising means for engaging said pendulum when the pendulum is in its second position, said second electrical conductor being spaced from and disengaged from said pendulum when the pendulum is in its first position;

a third electrical conductor comprising means electrically connectable to a source of electrical energy for said lamp assembly; and a lamp electrically connected to said second and third electrical conductors, said first and second electrical conductors being electrically connected, causing said lamp to be illuminated, when said pendulum is in said second pendulum position, and said first and second electrical conductors being electrically disconnected, causing said lamp to be extinguished, when said pendulum is in said first pendulum position, wherein said mounting means for the pendulum comprises:

a pivot pin defining the pivotal axis for said pendulum;

means mounting said pendulum on said pivot pin; and means mounting said pivot pin on said member.

15. A lamp assembly as recited in claim 14 wherein:

said pendulum is composed of electrically conductive material;

said pivot pin is composed of electrically conductive material and is in electrical engagement with the pendulum when the pendulum is in its first and second positions; and said first electrical conductor is in electrical engagement with said pivot pin when the pendulum is in its first and second positions.

16. A lamp assembly as recited in claim 15 wherein:

said pivot pin comprises a pair of opposite axial ends;

and said first electrical conductor comprises means for engaging said pivot pin at one axial end thereof and for preventing substantial movement of said pivot pin in an axial direction relative to said mounting means for the pivot pin.

17. A lamp assembly as recited in claim 15 wherein:

said first electrical conductor comprises means for retaining said pivot pin in its mounting means.

18. A lamp assembly as recited in claim 17 wherein:

said second electrical conductor has an arcuately shaped part for embracingly engaging said cylindrically shaped bob portion of the pendulum when the pendulum is in its second position.

19. A lamp assembly, comprising:

a housing member capable of being moved between a pair of predetermined positions each angularly displaced from the other;

a pendulum;

means mounting said pendulum on said housing member for pivotal movement of said pendulum, relative to said housing member, between a first pendulum position and a second pendulum position angularly displaced from said first pendulum position;

said pendulum and said mounting means for the pendulum comprising means cooperating (a) to maintain said pendulum in its first position when said housing member is in one of said pair of predetermined positions and (b) to allow the pendulum to move, under an urging of gravity, from the pendulum's first position to its second position in response to movement of said housing member from its one predetermined position to another of said pair of predetermined positions for the housing member, angularly displaced from said one position of the housing member;

a first electrical conductor comprising means electrically connectable to a source of electrical energy for said lamp assembly;

a second electrical conductor comprising means for engaging said pendulum when the pendulum is in its second position, said second electrical conductor being spaced from and disengaged from said pendulum when the pendulum is in its first position;

a third electrical conductor comprising means electrically connectable to a source of electrical energy for said lamp assembly; and a lamp electrically connected to said second and third electrical conductors, said first and second electrical conductors being electrically connected, causing said lamp to be illuminated, when said pendulum is in said second pendulum position, and said first and second electrical conductors being electrically disconnected, causing said lamp to be extinguished, when said pendulum is in said first pendulum position, wherein:

said pendulum comprises an arm portion and a bob portion;

said bob portion having a circular cross section in a plane (a) which is parallel to the pivotal axis of said pendulum and (b) extends transversely to said arm portion of the pendulum.

* * * * *